United States Patent
Hallington

(10) Patent No.: US 9,407,985 B2
(45) Date of Patent: Aug. 2, 2016

(54) MICROPHONE ACTUATOR

(75) Inventor: Jim Hallington, Waterlooville (GB)

(73) Assignee: Clockaudio Limited, Waterlooville, Hampshire (GB)

( * ) Notice: Subject to any disclaimer, the term of this patent is extended or adjusted under 35 U.S.C. 154(b) by 0 days.

(21) Appl. No.: 14/125,279

(22) PCT Filed: Jun. 8, 2012

(86) PCT No.: PCT/GB2012/051301
§ 371 (c)(1),
(2), (4) Date: Jan. 13, 2014

(87) PCT Pub. No.: WO2012/168731
PCT Pub. Date: Dec. 13, 2012

(65) Prior Publication Data
US 2014/0169608 A1    Jun. 19, 2014

(30) Foreign Application Priority Data
Jun. 10, 2011    (GB) .................................. 1109720.1

(51) Int. Cl.
| | | |
|---|---|---|
| *H04R 3/00* | (2006.01) | |
| *H04R 1/08* | (2006.01) | |
| *H04R 1/02* | (2006.01) | |
| *F16M 11/28* | (2006.01) | |

(52) U.S. Cl.
CPC .. *H04R 3/00* (2013.01); *H04R 1/08* (2013.01); *F16M 11/28* (2013.01); *H04R 1/02* (2013.01); *H04R 1/021* (2013.01)

(58) Field of Classification Search
CPC .............. H04R 3/00; H04R 1/02; H04R 1/08; H04R 1/025; H04R 1/021; A47K 3/00; H02P 8/00; F16M 11/28

USPC ................................ 381/361–368, 388–389
See application file for complete search history.

(56) References Cited

U.S. PATENT DOCUMENTS

| | | | | |
|---|---|---|---|---|
| 3,007,014 A | * | 10/1961 | Bentman ....................... 381/363 |
| 7,058,193 B2 | * | 6/2006 | Lane ................... B60R 11/0247 |
| | | | | 379/420.03 |
| 7,788,892 B2 | * | 9/2010 | Schmidt et al. .................. 56/249 |
| 2008/0118053 A1 | * | 5/2008 | Beam et al. .............. 379/388.01 |

FOREIGN PATENT DOCUMENTS

| | | |
|---|---|---|
| CN | 200962661 | 10/2007 |
| CN | 201282544 | 7/2009 |

(Continued)

*Primary Examiner* — Davetta W Goins
*Assistant Examiner* — Oyesola C Ojo
(74) *Attorney, Agent, or Firm* — Stetina Brunda Garred & Brucker

(57) ABSTRACT

The present invention relates to a microphone actuator for fitting a microphone through the upper surface of a table such as that used in a boardroom. The microphone actuator comprises a stepper motor (2), coupled to a gear (4, 6, 8, 14) which is arranged to cause extension and/or retraction of a microphone (11) from or into a housing (20) respectively. The invention also relates to a method of initializing a microphone actuator comprising the steps of initially moving the actuator to a retracted position until a retracted limit stop is reached, receiving user input indicating that a setup mode has been entered, receiving user input indicating that the actuator should be extended or retracted, receiving user input indicating that a desired actuator position has been reached, and storing the desired actuator position in memory.

4 Claims, 3 Drawing Sheets

(56) References Cited

FOREIGN PATENT DOCUMENTS

| | | |
|---|---|---|
| GB | 454158 | 9/1936 |
| GB | 653093 | 5/1951 |
| GB | 2423213 | 8/2006 |
| GB | 2423667 | 8/2006 |
| JP | 2001188796 | 7/2001 |
| JP | 2010278880 | 12/2010 |
| JP | 2010278880 A * | 12/2010 ............... H04R 1/02 |
| KR | 20020051222 | 6/2002 |

* cited by examiner

MICROPHONE ACTUATOR

The present application claims priority to PCT International Application No. PCT/GB2012/051301 filed on Jun. 8, 2012, which application claims priority to GB 1109720.1 filed Jun. 10, 2011.

STATEMENT RE: FEDERALLY SPONSORED RESEARCH/DEVELOPMENT

Not Applicable.

BACKGROUND

This invention relates to a microphone, and in particular to a microphone for fitting through the upper surface of a table such as that used in a boardroom.

SUMMARY OF THE INVENTION

Increasingly, boardrooms are being fitted with audio visual equipment for example, for video conferencing purposes. Typically such equipment includes microphones placed near meeting participants. These may take the form of surface-mounted microphones on flexible arms or spring-loaded microphones recessed into the table surface.

In the case of spring-loaded devices, these allow the microphone to be placed flush or below the table surface when the audio visual equipment is not in use. They are manually raised by pushing down on the upper surface, which releases a catch and allows spring pressure to raise and hold the microphone above the table surface. This then allows good audio reception which otherwise would be attenuated by the material of the table surface. The microphones are put away below the table surface again using pressure on the upper surface of the microphone to resist the upward spring bias and re-engage the catch to hold the microphone flush with or below the table surface.

BRIEF DESCRIPTION OF THE DRAWINGS

Embodiments of the invention will now be described with reference to the drawings in which:—

DETAILED DESCRIPTION OF THE INVENTION

The microphone actuator is designed to be mounted in a desk or table. When not in use, the microphone is almost flush with the table surface (typically about 2 mm above the surface) or may be flush. When in use, it rises up to its working height of typically about 12 mm above the surface.

Figure 1:
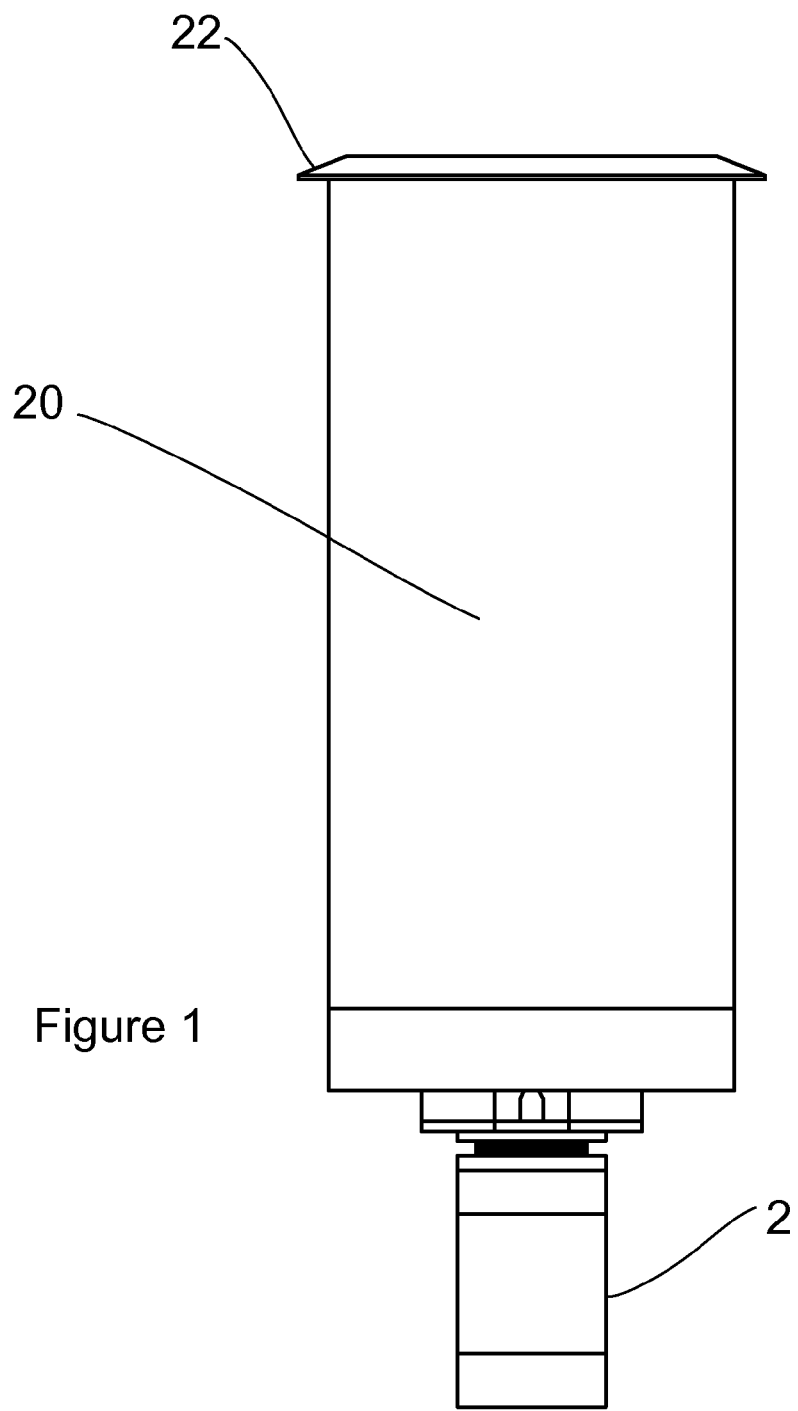
FIG. 1 is an elevation of a microphone.
Figure 2:
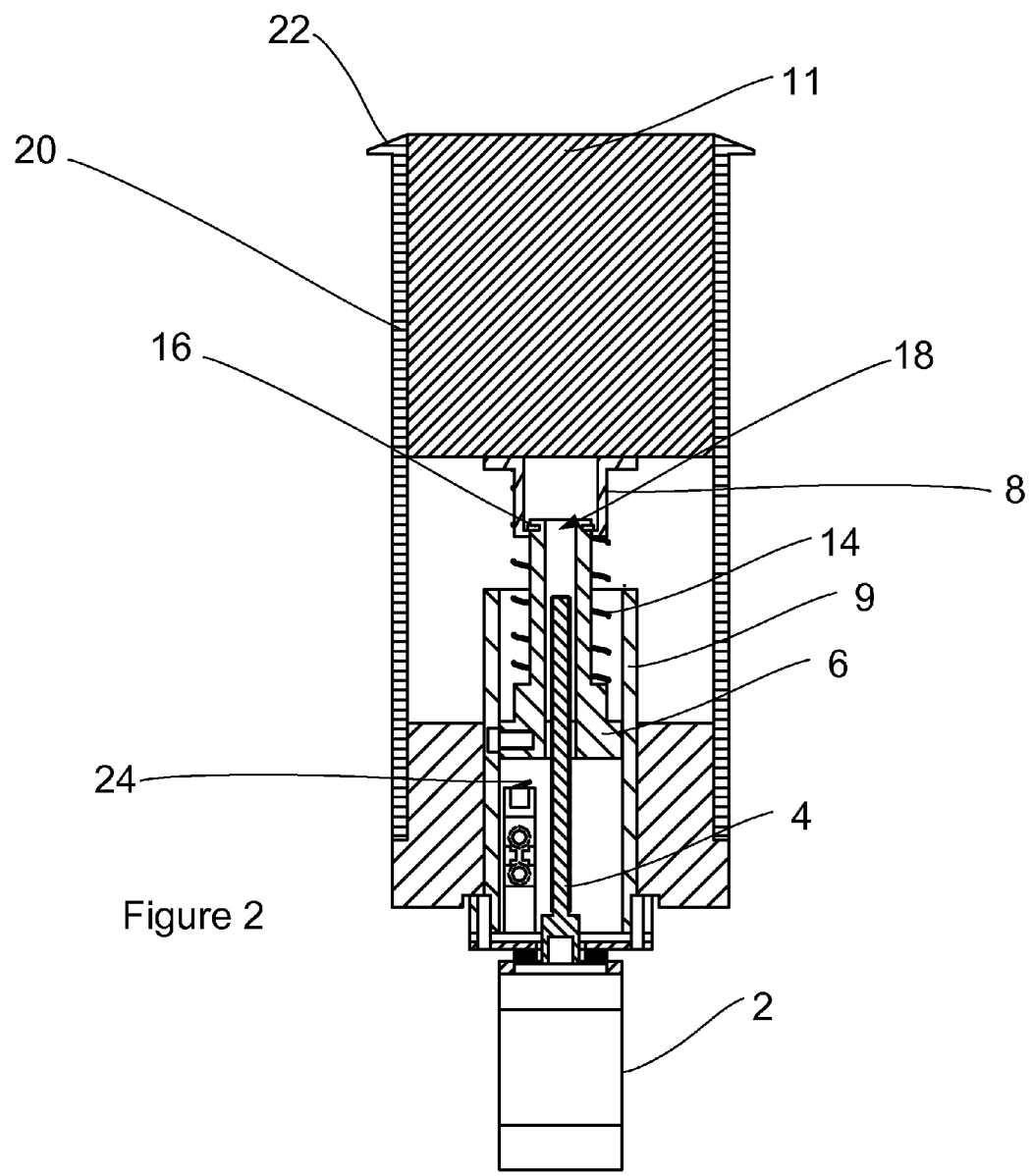
FIG. 2 is an axial, vertical cross section through FIG. 1.

With reference to FIGS. 1 and 2, the raising and lowering mechanism is driven by a small stepper motor 2 which has an actuator screw 4 attached to its spindle. As the stepper motor turns, the actuator screw 4 is screwed into or out of a crosshead 6. The crosshead 6 pushes an upper sleeve 8 up or down.

Figure 3:
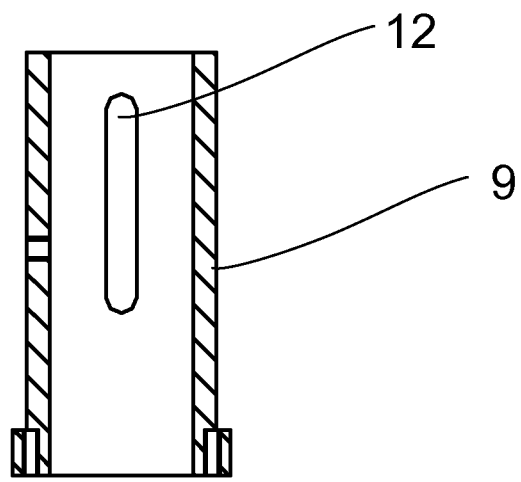
FIG. 3 is a section through the sleeve of FIG. 1, rotated axially through 90 degrees.
Figure 4:
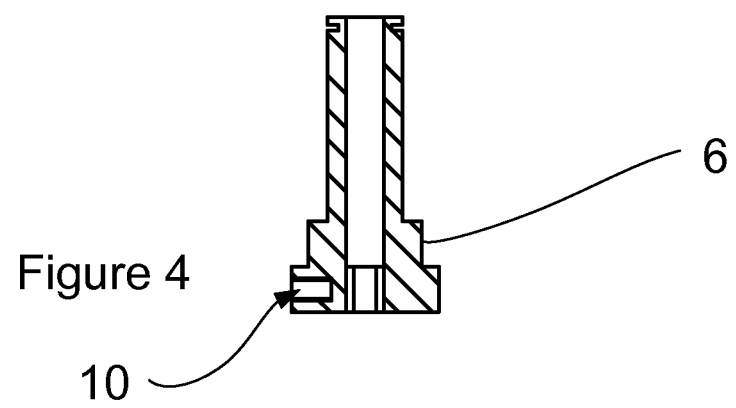
FIG. 4 is a section through the cross-head of FIG. 1.

With reference also to FIGS. 3 and 4, the crosshead 6 is prevented from rotating by a lower sleeve 9 in conjunction with a screwed dowel (not shown) which is screwed into an aperture 10 in the side of the crosshead 6 and locates in a slot 12 in the lower sleeve 9.

A microphone 11 is fixed to the upper end of the upper sleeve 8.

A spring 14 is lifted between the crosshead 6 and the upper sleeve 8, so that the crosshead 6 can push the upper 8 sleeve up. The spring 14 prevents the mechanism being damaged if a heavy object is placed on top of the microphone 11. If this happens, the spring 8 compresses and allows the microphone to be pushed down to tabletop level. When the weight is removed, the spring biases the microphone back up to its selected height.

A c-clip 16 attaches to the top of the crosshead 6, where it fits through a hole 18 in the top of the upper sleeve 8. This allows the crosshead to pull the sleeve 8 down when the stepper motor 2 and actuator screw 4 are reversed.

The mechanism is fitted into an annular housing 20, preferably with a collar 22 which is designed to rest on top of the upper table surface when the microphone actuator is installed.

A micro-switch 24 is fitted in the bottom of unit to define a home position for the mechanism.

In operation, the stepper motor is controlled by a microcontroller with an associated stepper motor control chip (not shown).

On powering the unit up, unless the home micro-switch 24 is already operated (indicating that the microphone is in the lowest allowed position), the microcontroller drives the stepper motor 2 to move the microphone 11 down until the home micro-switch 24 is operated. At this point a step count for the stepper motor 2 is set to zero. The microcontroller then moves the stepper motor in a direction which causes the microphone to move upwards towards the collar 22 until the step count matches a stored "lowered" position in which the microphone is level with the top of the bezel 22. This provides a self-initialisation of the microphone position which may be unknown, for example following an unexpected power interruption.

When a 12V signal is applied to a control port "raise" input, the microcontroller moves the stepper motor in the 'up' direction until the step count matches a stored 'raised' position. When the 12V signal is removed from the "raise" input, the microcontroller moves the stepper motor in a direction which causes the microphone 11 to move down into the housing 20 until the step count matches a stored "lowered" position. When moving the microphone in either direction, the microcontroller accelerates the stepper motor in stages to avoid loss of steps when overcoming initial friction in the mechanism.

Mute circuits are provided which mute the signal from the microphone except when it is in the "raised" position.

Additional control is provided by a mute touchswitch input which allows the raised microphone to be muted and unmuted by touching a button. The microphone can optionally be lowered when muted and raised again when unmuted. This option is selectable by a small switch inside the control box. The mute touchswitch includes LED lighting so that the touchswitch is lit different colours for the muted and unmuted modes e.g., green when the microphone is muted and red when it is raised and unmuted. These colours are user selectable.

A setup mode is provided, which is selected by a small switch inside the control box. Another small switch selects whether the "raised" or "lowered" position is being set. When the unit is in the setup mode, its position is controlled by two buttons inside the control box; one moving it up and the other moving it down. Pressing these buttons moves the microphone firstly at a slow speed and then progressively moving at higher speeds. This allows the microphone to be set to the desired height both quickly and accurately, multiple button presses being used as required. Once the required position has been reached, pressing a "set" button will store the step count in non-volatile memory. On exiting setup mode, the microphone is lowered until the home micro-switch 24 operates and is then raised to the "lowered" position.

The invention claimed is:

1. A microphone actuator comprising: a microphone drive mechanism for moving a microphone relative to a housing, the mechanism including a pair of inter-engaged threaded components mechanically coupled to the microphone and housing respectively and which cause relative movement between the microphone and the housing when the said pair are rotated relative to one another, and wherein one of the mechanical couplings between a threaded component and the microphone or housing is unidirectional such that it transmits force only in a first direction, the mechanism further including collapsible elastic means coupled in parallel with the unidirectional coupling and arranged to bias the unidirectional coupling in a second direction opposite to the first direction; the microphone actuator further comprising a stepper motor, wherein one of the inter-engaged threaded components is an actuator screw attached to a spindle of the stepper motor and the other inter-engaged threaded component is a crosshead arranged such that the actuator screw is screwable into or out of the crosshead to cause movement of the crosshead in the first or second direction.

2. A microphone actuator as claimed in claim 1, including a lower limit stop usable to self-calibrate the position of the microphone actuator.

3. A microphone actuator as claimed in claim 1 wherein the collapsible elastic means comprises a coil spring.

4. A microphone actuator as claimed in claim 1 wherein the collapsible elastic means allows movement of the microphone or housing relative to the threaded component to which the microphone or housing is mechanically coupled via the unidirectional coupling.

* * * * *